United States Patent Office 3,321,550
Patented May 23, 1967

3,321,550
CURABLE COMPOSITIONS OF A VINYL CHLORIDE POLYMER AND A POLYEPOXIDE CONTAINING AT LEAST TWO EPOXYCYCLOHEXYL GROUPS
Donald E. Hardman, Winfield, and Charles E. Metten, South Charleston, W. Va., assignors to Union Carbide Corporation, a corporation of New York
No Drawing. Filed July 30, 1964, Ser. No. 386,443
10 Claims. (Cl. 260—836)

This application is a continuation-in-part of application Ser. No. 42,746, filed July 14, 1960, now abandoned, and of application Ser. No. 121,359, filed July 3, 1961, now abandoned.

This invention relates to curable compositions and to the cured products resulting from heating them. In one aspect, the invention relates to curable compositions comprising (a) a polyepoxide, (b) a vinyl chloride polymer, and (c) a curing catalyst, and to the cured products resulting from heating these compositions. In another aspect, the invention relates to compositions which comprise a glass fibrous base impregnated with the curable compositions of the invention, and to the cured glass fibrous reinforced compositions produced therefrom.

It has been disclosed that mixtures containing vinyl chloride polymer, the diglycidyl ether of 2,2-bis(4-hydroxyphenyl)-propane, and a nitrogen-free curing agent can be heated to produce cured flexible compositions. It has also been disclosed that certain epoxy ethers, such as 2,3-epoxypropyl 2,3-epoxycyclohexyl ether, can be employed in solution coating formulations in which vinyl chloride polymers are employed as film-forming materials. The above-described prior art compositions, as well as other known formulations in which epoxide resins are employed in combination with vinyl chloride polymers, are characterized by relatively rapid loss in strength and other properties as said prior art compositions are exposed to increasing temperatures.

The present invention is based upon the surprising discovery that cured compositions having unexpectedly superior retention of properties at elevated temperatures can be prepared from curable compositions that comprise:

(a) A compound containing at least two epoxycyclohexyl groups interconnected by an organic moiety having at least one ester group,
(b) A vinyl chloride polymer, and
(c) A curing catalyst.

In addition to the superior high temperature properties mentioned above, the cured compositions of the invention have an excellent balance of properties heretofore not available in any of the prior art compositions. Among the desirable properties exhibited by the cured compositions of the invention are one or more of the following properties:

(1) Excellent retention of properties at elevated temperatures;
(2) Good resistance to extraction by organic solvents;
(3) High degree of hardness;
(4) Unusually good adhesion to substrates, for example, metal, glass, various plastics, and the like;
(5) Good electrical properties;
(6) Fungus resistance;
(7) Low cold flow or creep;
(8) Excellent heat and light resistance;
(9) High heat distortion temperature;

and many other properties.

The polyepoxides employed in the invention are those that contain at least two epoxycyclohexyl groups that are interconnected by an organic moiety that has at least one ester group. By the term "epoxycyclohexyl" is meant a group of the formula:

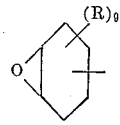

wherein R represents hydrogen, alkyl, for instance, lower alkyl of from 1 to 4 carbon atoms, or halogen. Thus, the polyepoxides employed in the invention can be represented by Formula I:

I 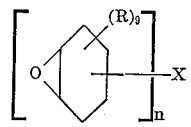

wherein each R individually represents hydrogen, alkyl, or halogen; wherein $n$ represents an integer that has a value of at least 2, for example, from 2 to 4; and wherein X represents an organic group that has a valence of $n$, that contains at least one ester group, and that contains no non-hydrocarbon moieties other than carbonyloxy and ether groups. Preferably, the variable X will contain from 2 to 20 carbon atoms. It is preferred that the polyepoxide that is represented by Formula I be a liquid at about room temperature, for instance, it is desirable that the polyepoxide have a viscosity of less than about 6000 centipoises at temperatures below about 40° C.

Among the polyepoxides that are useful in the invention are those that are defined by Formula II:

II 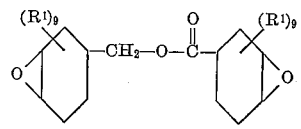

wherein each $R^1$ individually represents hydrogen or alkyl, preferably lower alkyl of from 1 to 4 carbon atoms. The preparation of these diepoxides is found in U.S. Patent No. 2,716,123. Among the diepoxides that are represented by Formula II that deserve particular mention are the following compositions: 3,4-epoxycyclohexylmethyl 3,4-epoxycyclohexanecarboxylate; 3,4-epoxy-1-methylcyclohexylmethyl 3,4-epoxy-1-methylcyclohexanecarboxylate; 3,4-epoxy-6-methylcyclohexylmethyl 3,4-epoxy-6-methylcyclohexanecarboxylate; and the like.

A second class of polyepoxides that are useful in the invention are those diepoxides that are represented by Formula III:

III 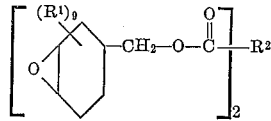

wherein each $R^1$ individually represents hydrogen or alkyl, preferably lower alkyl of from 1 to 4 carbon atoms, and wherein $R^2$ represents a divalent hydrocarbon group of from 0 to 10 carbon atoms. The preparation of the diepoxides that are represented by Formula III is found in U.S. Patent Nos. 2,750,395 and 2,863,881. Among the diepoxides that are represented by Formula III that deserve particular mention are the following compositions: bis(3,4-epoxy-6-methylcyclohexylmethyl) adipate; bis(3,4-epoxycyclohexylmethyl) adiphate; bis(3,4-epoxycyclohexylmethyl) oxalate; bis(3,4-epoxycyclohexylmethyl) succinate; bis(3,4-epoxy-6-methylcyclohexylmethyl) sebacate; bis(3,4-epoxycyclohexylmethyl) maleate; bis(3,4-epoxycyclohexylmethyl) terephthalate; and the like.

Another useful class of polyepoxides that contain at least two epoxycyclohexyl groups are those polyepoxides that are represented by Formula IV:

IV
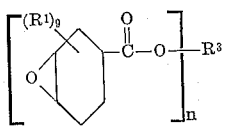

wherein n is an integer having a value in the range of from 2 to 4, wherein each R¹ individually represents hydrogen or alkyl, preferably lower alkyl of from 1 to 4 carbon atoms, and wherein R³ represents a saturated aliphatic group having a valence of n. The preparation of the polyepoxides that are represented by Formula IV is known, for example, see U.S. Patent Nos. 2,745,847 and 2,884,408. Representative epoxides that are within the scope of Formula IV are the following compositions: ethylene glycol bis(3,4 - epoxycyclohexanecarboxylate); 2-ethyl-1,3-hexanediol bis(3,4-epoxycyclohexanecarboxylate); diethylene glycol bis(3,4-epoxy - 6 - methylcyclohexanecarboxylate); glycerol tris(3,4 - epoxycyclohexanecarboxylate); pentaerythritol tetrakis(3,4-epoxycyclohexanecarboxylate); and the like.

A further class of polyepoxides that are useful in the invention are those that are represented by Formula V:

V
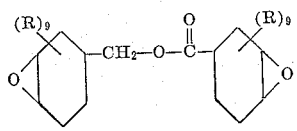

wherein each R individually represents hydrogen, alkyl, preferably lower alkyl of from 1 to 4 carbon atoms, or halogen, preferably chloro, bromo, or iodo, provided that at least one R is halogen. The preparation of the diepoxides that are represented by Formula V is disclosed in U.S. Patent No. 2,874,167. Among the diepoxides that are represented by Formula V that deserve particular mention are (1-bromo - 3,4 - epoxycyclohexane-1-yl)methyl 1-bromo-3,4-epoxycyclohexanecarboxylate, and the like.

The preferred polyepoxides for use in the invention are those that are represented by Formulas II and III. Particularly preferred polyepoxides are 3,4-epoxy-6-methylcyclohexylmethyl 3,4-epoxy-6-methylcyclohexane carboxylate; 3,4-epoxycycloehexylmethyl 3,4-epoxycyclohexanecarboxylate; bis(3,4-epoxy - 6 - methylcyclohexylmethyl) adipate; and bis(3,4-epoxycyclohexylmethyl) adiphate.

In some cases, other epoxides can be employed in the invention along with the polyepoxide that contains at least two epoxycyclohexyl groups interconnected by an organic group that has at least one ester group. Such other epoxides are employed only in minor amounts, that is, in amounts of less than 50 weight percent of the epoxide portion of the formulation, preferably less than 35 weight percent, and more preferably less than 20 weight percent of the epoxide portion of the formulation.

The vinyl chloride polymers employed in the invention are the homopolymers of vinyl chloride and the copolymers of vinyl chloride with at least one other monomer that is copolymerizable therewith, wherein at least 50 weight percent of the monomer units are vinyl chloride. Among the vinyl chloride polymers that are useful in the invention are vinyl chloride homopolymer, vinyl chloride-vinyl acetate copolymer, vinyl chloride-vinylidene chloride copolymer, vinyl chloride-vinyl acetate-maleic anhydride copolymer, vinyl chloride-vinyl acetate-vinyl alcohol copolymer, and the like.

The molecular weight of the vinyl chloride polymer is conveniently characterized in terms of reduced viscosity. The reduced viscosity is obtained by dividing the specific viscosity by the concentration measured in grams of polymer per 100 millilters of a given solvent at a given temperature. The specific viscosity is obtained by dividing the difference between the viscosity of the solution and the viscosity of the solvent by the viscosity of the solvent. Unless otherwise indicated, the reduced viscosities of the vinyl chloride polymers employed herein were measured at a concentration of 0.2 gram of polymer per 100 milliliters of nitrobenzene at 20° C.

Vinyl chloride polymers having reduced viscosities of from about 0.1, and lower, to about 10, and higher, are operable in this invention. The preferred range of reduced viscosities is from about 0.2 to about 4.0.

The curing catalysts which are employed in the invention are those compositions which will catalyze the homopolymerization of a polyepoxide. Suitable catalysts include acids such as sulfuric acid, alkanesulfonic acids, benzenesulfonic acid, perchloric acid, phosphoric acids, and the like; metal halide Lewis acids and their complexes such as ferric chloride, aluminum chloride, zinc chloride, boron trifluoride, boron trifluoride-ether complexes, boron trifluoride amine complexes, e.g., boron trifluoride-monoethylamine complex, boron trifluoride-piperidine complex, and the like; bases such as sodium hydroxide, alkali metal alcoholates, tertiary amines, e.g., benzyldimethylamine, dimethylaminomethylphenol, 2,4,5 - tri(dimethylaminomethyl)-phenol, and the like; alkyl titanates such as tetraisopropyl titanate, tetrabutyl titanate, and the like; and other similar catalysts having curing activity. Preferred catalysts are the acidic catalysts and the alkyl titanates. The particularly preferred catalysts from this group include boron trifluoride-etherate, boron trifluoride-amine complexes, metal fluoboroxates, e.g., zinc fluoborate, copper fluoborate, lead fluoborate, and tetraalkyl titanates, e.g., tetraisopropyl titanate and tetrabutyl titanate.

In addition to the polyepoxide, vinyl chloride polymer, and curing catalyst, the compositions can contain many other components. For example, most of the stabilizers that are commonly used in vinyl chloride polymer formulations, can also be used in the compositions of this invention. These are well known in the art, and include, for example, trioctyl phosphite, barium laurate/cadmium laurate complex, barium octylphenate/cadmium octylphenate complex, zinc laurate, zinc octoate, and the like. However, in selecting a stabilizer, it should be kept in mind that some compounds containing tin or lead have been found to retard the cure of the polyepoxide, as evidenced by a slight reduction in hardness. Therefore, when employing a tin- or a lead-containing stabilizer it is desirable to use a slightly higher catalyst concentration or a slightly longer baking period in order to effect full cure of the polyepoxide.

If desired, the curable compositions provided by this invention can be pigmented or filled or both. The materials commonly used for this purpose in plastisols and other formulations containing vinyl chloride polymers can be employed in this invention. Exemplary pigments and fillers which can be employed include titanium oxide white pigments, iron oxide red, black and brown pigments, chrome green, chrome yellow, toluidine red, carbon black pigments, zinc oxide, ultramarine blue, silica, calcium carbonate, and the like. As is the case with the stabilizers, some pigments are found to retard the cure of the epoxide. It is therefore desirable to use more catalyst or a longer bake in order to overcome this effect. Cadmium red selenide and phthalocyanine blue are among the pigments which have this retarding effect on the cure of the epoxide.

The components which are essential to the curable compositions of this invention are (a) a polyepoxide having at least 2 epoxycyclohexyl groups, (b) a vinyl chloride polymer, and (c) a catalyst. The proportions of these reagents can vary over a wide range. For example, the curable composition can contain from about 10, and lower, to about 90, and higher, parts by weight of polyepoxide, and from about 90, and higher, to about 10, and lower, parts of vinyl chloride polymer, the total parts being 100. The preferred proportions vary from about 25 to about 75 parts by weight of polyepoxide, and from about 75 to about 25 parts by weight of vinyl chloride polymer, the total parts being 100. Highly preferred proportions are from about 35 to about 60 parts by weight of polyepoxide, and from about 65 to about 40 parts by weight of vinyl chloride polymer, the total parts being 100.

In addition, the formulation contains a catalytic amount, for instance, from about 1 percent to about 10 percent catalyst, based on weight of polyepoxide. The preferred catalyst concentration is from about 3 percent to about 8 percent, based on weight of polyepoxide. Highly preferred is a catalyst concentration of from about 4 percent to about 6 percent, based on weight of polyepoxide. The exact concentration of the catalyst will depend, to an extent, on variables such as curing temperature, the particular epoxides employed, solubility of the catalyst in the reagents, and the like.

The proportions of the other, non-essential components which can be added to the formulation when desired are not critical, and are employed in amounts which are standard in the art. For example, stabilizers for vinyl halide polymers are usually employed in concentrations varying from about 1 percent to about 5 percent, based on weight of the vinyl halide polymer. Pigments and fillers can be employed in the same proportions and concentrations as are used in prior art formulations. Other polymers and polymer-forming materials can be used in varying amounts, but normally are not employed in amounts greater than about 50 percent by weight of the total formulation.

The curable compositions of the invention can be prepared by mechanically mixing the components by known methods. The vinyl chloride polymer, which is employed in the form of a powder, will be dispersed in the polyepoxide in a manner similar to that of conventional plastisols and organosols. The curing catalyst will either be dissolved or dispersed in the polyepoxide, depending on the solubility characteristics of the particular materials used. In many cases it is desirable to employ a curing catalyst that is relatively inactive at room temperatures but which is activated when heated to elevated temperatures. The boron trifluoride-amine complexes are excellent examples of such curing catalysts.

In transforming the curable compositions of this invention into the cured products also provided by this invention, it is probable that the steps set forth below occur. However, it is to be understood that this invention is not limited by or restricted to any theory of action set forth herein.

When said curable compositions are heated, fusion into a homogeneous mass occurs. Concurrently and subsequently to this fusion, the catalyst promotes polymerization of the polyepoxide into a hard, solvent-resistant, heat-resistant polymer. The mechanism of this polymerization is believed to be as follows, using a boron trifluoride-amine complex as an exemplary catalyst:

$$BF_3NR_3 \xrightarrow{Heat} BF_3 + NR_3$$

(BF$_3$ is the more active catalyst)

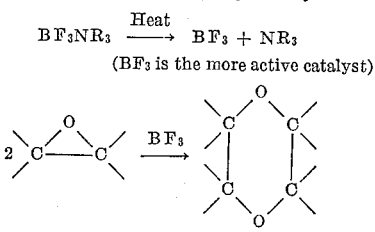

These reactions produce a polymer when a polyepoxide is employed. The resulting cured product is a homogeneous mass possessing many useful properties, including good heat resistance, high hardness, good solvent resistance and excellent adhesion to metals. Therefore, the compositions of this invention find utility in many applications, including molding, casting, surface coatings, electrical insulation, laminating, and the like.

The baking or curing conditions employed depend, to an extent, on variable such as nature of catalyst, nature of polyepoxide, the size and shape of the article being formed, presence of other materials in the formulation, and the like. It is preferred that the bake be sufficient to effect full cure of the polyepoxide, but at the same time, it is preferred that the bake not be of such a nature that excessive degradation of the vinyl chloride polymer occurs. The curable compositions of this invention can be baked at elevated temperature, e.g., at a temperature in the range of from about 200° F. to about 600° C. A temperature range of from about 250° F. to about 450° F. is preferred. The baking time can be varied from less than about 5 minutes up to about two hours and longer. A baking time of from about 5 minutes to about 30 minutes is preferred, however it will depend, to a large extent, on the particular temperature employed. If desired, fusion of the curable compositions of this invention into a solid homogeneous mass can be effected at a relatively low temperature, followed by a bake at higher temperature. This procedure is advantageous, for example, in cases where there is a possibility that the polyepoxide will fully polymerize before complete fusion of the composition into a homogeneous mass occurs. The curable compositions of this invention can be cured at virtually any pressure desired, ranging from subatmospheric through atmospheric to very high pressures.

In an important embodiment, the invention provides glass fibrous reinforced compositions comprising the polyepoxide-vinyl chloride polymer compositions of the invention reinforced by glass fibers. These glass fibrous reinforced compositions uniquely combine desirable properties of both cured polyepoxides and vinyl chloride polymers. The cured compositions are infusible and possess high strength, which are characteristics shown by cured polyepoxides. At the same time, the vinyl chloride polymers impart flame resistance, toughness, and relatively low cost to the compositions. Hence, the compositions can be looked upon as being flame resistant and low cost cured epoxide compositions, or as being thermoset, infusible vinyl chloride polymers possessing very high strength. In addition, the compositions of the invention have a very important processing advantage over conventional epoxy-containing glass fibrous reinforced compositions. This advantage is that when the "pre-preg" technique is employed to produce the cured glass fibrous reinforced compositions, the pre-impregnated glass fibrous base has a much longer storage life than heretofore obtainable with conventional epoxy systems.

In preparing the compositions of the invention, many different glass fibrous bases can be employed. For example, the glass fibrous base can be in the form of bidirectional fabrics, unidirectional fabrics, mats, yarns, continuous strands, chopped strands, rovings, tapes, filaments, and the like. The glass can be untreated or it can have a surface treatment of, for example, methacrylato chromic chloride (Volan A treatment), polysiloxane resin based on hydrolyzed vinyl-trichlorosilane, and the like. The various known techniques for preparing reinforced plastic articles can be employed, such as the wet lay-up technique, tape and filament winding, the "pre-preg" technique, and the like.

In preparing the glass fibrous reinforced compositions, the curable polyepoxide-vinyl chloride polymer-catalyst mixture (which can contain other components such as stabilizers, pigments, fillers, and the like) is employed in the form of a dispersion, as is normally the case with the other embodiments of the invention. The dispersion can readily be prepared by simply stirring the vinyl chloride polymer into the particular polyepoxide employed. Techniques which employ higher shear, such as mixing on a three-roll mill, can also be employed, if desired. It is sometimes desirable to add thinners and other components to the formulation after the dispersion of vinyl chloride polymer in polyepoxide has been prepared. It is also preferred to add the catalyst just before the dispersion is to be employed to impregnate the glass fibrous base.

As one of its aspects, the invention provides a composition which comprises a glass fibrous base impregnated with the curable compositions described above (i.e., polyepoxide-vinyl chloride polymer-catalyst mixture). One of the most useful methods for preparing this impregnated glass fibrous composition is known as the pre-preg or pre-loading technique. In carrying out the pre-preg technique, a fibrous base is impregnated with a curable composition, and then the impregnated base is subjected to heat to drive off volatiles. The heating operation also gels the impregnant, but does not significantly advance or B-stage the epoxy as was the case with conventional epoxy laminates. The fibrous base impregnated with gelled but not cured composition can then be stored for a period of time before being converted to a cured fibrous reinforced article by the application of heat and pressure. Heretofore, when epoxy resins have been applied to fibrous bases by the pre-preg or pre-loading technique, the B-staged impregnated material has had a short storage life, which made it necessary to prepare the cured fibrous reinforced article within a relatively short time, i.e.-within about two or three days if the partially cured or B-staged material was stored at room temperature or, preferably under refrigeration. One of the major advantage of the present invention is that when the pre-preg or pre-loading technique is employed, the resulting gelled, but not B-staged, impregnated glass fibrous compositions can be stored for at least three weeks at room temperature before being converted into cured glass fibrous reinforced articles.

In applying the pre-preg techinque to the present invention, the curable plastic composition is preferably employed in the form of a dispersion of vinyl chloride polymer in the other components. The glass fibrous base can be impregnated by hand dipping, continuous dipping, or other standard method. It may be necessary to adjust the viscosity of the dispersion by thinning with, for example, aliphatic hydrocarbons or mixtures thereof with methyl isobutyl ketone of diisobutyl ketone. The exact amount of thinner employed can readily be determined by routine laboratory experimentation, and will depend upon factors such as the nature and proportions of the components of the curable composition employed, the nature of the impregnating technique (for example, with a high speed continuous dip, a low viscosity impregnating liquid is desirable), the amount of solids pick up desired on the glass fibrous base, and the like. The impregnated base is then dried at elevated temperatures for a period of time sufficient to drive off volatiles (down to about 1 to 3 weight percent, based on weight of impregnated base) and to gel the dispersion. The exact drying conditions employed can readily be determined by routine laboratory experiments. As a guide, it has been found that at drying temperatures of from about 50° C. to about 100° C., a suitable drying time can be found in the range of from about 30 seconds to about 10, or at most 30, minutes. If the drying temperature is kept below the temperature at which the catalyst employed becomes activated, the curing of the polyepoxide portion of the formulation will be kept to a minimum during the drying. The resultant composition comprises a glass fibrous base impregnated with the curable plastic composition described hereinabove, wherein said curable plastic composition is in a gelled state. (The term "gelled" refers to solid or semi-solid compositions in which the vinyl chloride polymer and the other components are absorbed in one another.)

Standard commercial treaters can be utilized for the impregnation and drying step, in which case, continuous lengths of glass fabric, mat, filament, tape, and the like, can be employed as the glass fibrous base.

Another desirable method for impregnating the glass fibrous base is that which is known commercially as the wet lay-up technique. By this procedure, the fibrous glass base in the form of fabric, mat, rovings, chopped strands, or the like, is placed against a mold in one or more layers. The curable composition is then simply poured, sprayed, or the like, over the entire face of the mold that is covered with glass fibrous base (the operation can be repeated for each layer if a plurality of layers of glass base are employed). The mold is then subjected to heat and pressure to cure the curable composition to produce the cured glass fibrous reinforced composition of the invention.

The plastic to glass ratio of the compositions of the invention can vary widely. For example, useful compositions can be prepared which have plastic contents of from about 20 weight percent, and lower, to about 60 weight percent, and higher, based on weight of plastic and glass. The preferred proportions are from about 30 to about 50 weight percent of plastic, based on weight of plastic and glass.

Heat and pressure are employed to convert the glass fibrous base impregnated with the curable composition described above into the cured glass fibrous reinforced compositions of the invention. A suitable temperature can normally be found in the range of from about 100° C. to 200° C., and preferably from about 150° C. to about 170° C. The pressure can vary from about 10 p.s.i.g. to as high as 3000 p.s.i.g. The preferred pressure is from about 10 to 500 p.s.i.g. Hence, bag molding and vacuum molding can be employed as well as closed press molding. The heating and pressing cycle (i.e., curing cycle) will generally take from about 10 to about 60 minutes, and preferably from about 15 to 30 minutes. It has been found that with the higher vinyl chloride polymer contents (for example, from 45 to 70 weight percent, based on weight of vinyl chloride polymer and polyepoxide having at least two cyclohexenyl oxide groups), the pressure is preferably higher and the curing time is preferably longer than with the compositions having lower vinyl chloride polymer contents.

A very useful embodiment of the invention comprises the cured glass fibrous reinforced compositions of the invention having a portion thereof coated with vinyl chloride polymer. This embodiment of the invention is employed to produce articles which combine the structural strength of the glass fibrous reinforced compositions with certain desirable properties exhibited by vinyl chloride polymers, that is, surface texture and appearance, wear resistance, and the like. These coated compositions can readily be prepared by employing the methods taught hereinabove for the preparation of the cured compositions of the invention, with the additional act of covering the desired portion of the curable composition of the invention with a sheet of vinyl chloride polymer so that the sheet and the curable compositions are in close contact with and are pressed against one another during the curing cycle. In the cured article, the adhesion between the vinyl chloride polymer coating and the glass fibrous reinforced composition is excellent. The vinyl chloride polymer used for the coating can be either poly(vinyl chloride), vinyl chloride-vinyl acetate copolymer, or other polymer wherein at least 50 weight percent of the monomer units are vinyl chloride. The reduced viscosity of the polymer employed as the coating can be from about 0.1 to about 10. The polymer can be plasticized or unplasticized, whichever is desired.

An alternative method for producing the vinyl chloride polymer coated article is to employ a dispersion of vinyl chloride polymer in a plasticizer (plastisol or rigidsol) in place of the vinyl chloride polymer sheet mentioned above. In this method, gelling of the dispersion takes place concurrently with curing of the composition of the invention, and as a result, adhesion between the coating and substrate is even better than when a sheet of polymer is employed. The plastisols, etc., which can be used are those which are standard in the art.

The cured glass fibrous reinforced plastic compositions of the invention have wide utility. They can be employed as structural members, such as architectural panels or buiding panels, as electrical insulation, as shaped articles, and the like. The cured compositions coated with vinyl chloride polymer have added utility as decorative articles, luggage, and the like.

Various modifications of the invention can be made. For example, a small percentage of a liquid non-reactive plasticizer can be included in the formulation to increase flexibility, etc. However, since such plasticizers have a detrimental effect on high temperature properties, small amounts are normally used. For example, non-reactive liquid plasticizers are preferably employed in amounts of less than 25 weight percent, based upon the weight of the polyepoxide employed. In the glass fiberous reinforced embodiment of the invention, styrene can be added to the formulation. The styrene is polymerized by means of a free radical catalyst such as a peroxide during the curing step, which must be performed under pressure to prevent the volatile styrene from boiling out of the formulation.

The following example illustrates various aspects of the invention. Parts are by weight unless otherwise specified.

*Example 1*

A formulation consisting of 25 parts of 3,4-epoxy-6-methylcyclohexylmethyl 3,4-epoxy-6-methylcyclohexanecarboxylate, 25 parts of a homopolymer of vinyl chloride having a reduced viscosity of about 1.42 in nitrobenzene, and 1.3 parts of boron trifluoride-piperidine, was stirred together to make a paste, which was then milled one pass through a three roll mill. This paste was poured into a circular mold and molded for 15 minutes at 375° F. and 15,000 p.s.i. The resultant plaque was 20 mils thick, and exhibited excellent retention of physical properties at elevated temperature, as is shown in Table I below.

*Example 2*

A formulation consisting of 25 parts of bis(3,4-epoxy-6-methylcyclohexylmethyl) adipate, 25 parts of a vinyl chloride homopolymer having a reduced viscosity of about 1.42 in nitrobenzene, and 1.3 parts of boron trifluoride-piperidine, was stirred together to make a paste, which was then milled one pass through a three roll mill. This paste was poured into a circular mold and molded for 15 minutes at 375° F. and 15,000 p.s.i. The resulting 20-mil plaque exhibited excellent retention of physical properties at elevated temperature, as is shown in Table I below.

*Example 3*

A formulation consisting of 50 parts of the diglycidyl ether of 2,2-bis(para-hydroxyphenyl)propane which contained 5 percent by weight of boron trifluoride-para cresol, and 50 parts of a poly(vinyl chloride) homopolymer having a reduced viscosity of about 1.42 in nitrobenzene, was stirred together to make a paste, which was then milled one pass on a three roll mill. This paste was poured into a circular mold and molded for 15 minutes at 375° F. and 15,000 p.s.i. The resulting 20-mil plaque exhibited poor retention of physical properties at elevated temperatures, as is shown in Table I below.

*Example 4*

A formulation consisting of 50 parts of the digylcidyl ether of 2,2-bis(para-hydroxy phenyl)propane which contained 5 weight percent of boron trifluoride-piperidine, and 50 parts of a poly(vinyl chloride) homopolymer having a reduced viscosity of about 1.42 in nitrobenzene, was stirred together to make a paste, which was then milled one pass on a three roll mill. This paste was poured into a circular mold and molded for 15 minutes at 375° F. and 15,000 p.s.i. The resulting 20-mil plaque exhibited poor retention of physical properties at elevated temperatures, as is shown in Table I below.

A comparison of the stiffness/temperature characteristics exhibited by the cured compositions in Examples 1–4 was made. Samples measuring 3 inches by ½ inch were cut from the molded plaques, and were measured for stiffness/temperature properties on a model TM Instron machine, which measures the force required to elongate the sample 1 percent at a given temperature. The data which is shown in Table I, points up the excellent retention of strength at elevated temperature exhibited by the compositions of this invention (Examples 1 and 2) when compared with other plastisol compositions (Examples 3 and 4).

TABLE I

| Examples | Stiffness/Temperature (p.s.i.) | | | |
|---|---|---|---|---|
| | 1 | 2 | 3 | 4 |
| Temp., °C.: | | | | |
| 25 | | 212,140 | 132,197 | 201,908 |
| 30 | | 203,981 | 126,321 | 188,142 |
| 40 | 113,102 | 187,663 | 89,600 | 135,829 |
| 50 | 111,633 | 163,185 | 20,564 | 33,498 |
| 60 | 102,820 | 102,806 | 10,722 | 3,046 |
| 70 | 95,745 | 24,477 | 1,395 | 532 |
| 80 | 71,239 | 2,839 | 1,042 | 440 |
| 90 | 36,721 | 832 | 896 | 385 |
| 100 | 22,767 | 652 | 734 | 348 |
| 110 | 16,524 | 554 | 602 | 312 |
| 120 | 10,575 | 554 | 528 | 256 |
| 130 | 6,462 | 505 | 455 | 238 |
| 140 | 4,039 | 440 | 352 | 183 |

*Examples 5–7*

Three plastisol compositions were prepared which had the following formulations:

| Example | 5 | 6 | 7 |
|---|---|---|---|
| PVC resin A [1] | 60.0 | 60.0 | 60.0 |
| PVC resin B [2] | 40.0 | 40.0 | 40.0 |
| Monomeric epoxide A [3] | 35.0 | | |
| Monomeric epoxide B [4] | | 35.0 | |
| Monomeric epoxide C [5] | | | 35.0 |
| Epoxidized Soyabean Oil | 35.0 | 35.0 | 35.0 |
| Boron Trifluoride-Piperidine | 3.5 | 3.5 | 3.5 |
| PVC Stabilizer A [6] | 2.0 | 2.0 | 2.0 |
| PVC Stabilizer B [7] | 1.0 | 1.0 | 1.0 |
| Anti-Foam Agent [8] | 0.5 | 0.5 | 0.5 |
| Plastisol Viscosity Depressant [9] | 1.0 | 1.0 | 1.0 |

[1] A poly (vinyl chloride) homopolymer having a reduced viscosity in nitrobenzene of about 1.42.
[2] A vinyl chloride-vinylidene chloride copolymer having from about 3–5 percent vinylidene chloride units, and a reduced viscosity in nitrobenzene of about 1.8.
[3] Vinyl cyclohexene dioxide.
[4] Bis(3,4-epoxy-6-methylcyclohexylmethyl) adipate.
[5] 3,4-epoxy-6-methylcyclohexylmethyl 3,4-epoxy-6-methylcyclohexanecarboxylate.
[6] Barium-cadmium octyl phenate.
[7] Zinc octoate.
[8] SAG-47—A dimethyl polysiloxane oil emulsion in water.
[9] PVD-105C—Two thirds (by weight) of 3,6-dimethyl-4-octyne-3,6-diol and one third Tergitol NPL (an alkyl phenoxy polyethylene glycol)

The plastisol composition of each example was stirred to make a paste. The resulting pastes were poured into circular molds and molded for 15 minutes at 375° F. and 15,000 p.s.i. Samples from each plaque were subjected to stiffness/temperature tests, the results of which are tabulated in Table II below. These results again point up the improvement in retention of strength at elevated temperatures which are shown by the cured compositions of this invention. The epoxide employed in Example 5 has only one cyclohexane oxide group in the molecule, and the cured composition resulting therefrom shows inferior retention of strength at elevated temperatures when compared with Examples 6 and 7.

TABLE II

| Example | Stiffness/Temperature (p.s.i.) | | |
|---|---|---|---|
| | 5 | 6 | 7 |
| Temp., °C.; | | | |
| 25 | 51,973 | 78,928 | 110,993 |
| 30 | 27,307 | 66,997 | 98,661 |
| 40 | 8,016 | 34,875 | 63,424 |
| 50 | 1,127 | 17,437 | 31,712 |
| 60 | 369 | 5,873 | 9,161 |
| 70 | 229 | 1,082 | 1,233 |
| 80 | 211 | 495 | 669 |
| 90 | 193 | 422 | 563 |
| 100 | 140 | 385 | 493 |
| 110 | 123 | 330 | 422 |
| 120 | 105 | 312 | 387 |
| 130 | 70 | 220 | 352 |
| 140 | 52 | 183 | 281 |

Example 8

A formulation consisting of 25 parts of 3,4-epoxycyclohexylmethyl 3,4-epoxycyclohexanecarboxylate, 25 parts of a poly(vinyl chloride) homopolymer having a reduced viscosity of about 1.42 in nitrobenzene, and 1.0 part of boron trifluoride-ethylamine, is stirred together to make a paste which is then milled one pass through a three roll mill. This paste is poured into a circular mold and is molded for 15 minutes at 375° F. and 15,000 p.s.i. The resulting 20-mil plaque exhibits excellent retention of physical properties at elevated temperature.

Examples 9–16

These examples illustrate the effect on physical properties of varying the proportion of polyepoxide to vinyl chloride polymer. In each example, 100 parts by weight of 3,4-epoxy - 6 - methylcyclohexylmethyl 3,4-epoxy-6-methylcyclohexanecarboxylate were employed, with 5 percent boron trifluoride-piperidine, based on weight of said epoxide, used as the catalyst. The vinyl chloride polymer employed was a dispersion grade vinyl chloride homopolymer having a reduced viscosity of about 1.32 in nitrobenzene. The components were stirred together to form a paste, and then milled one pass through a three roll mill. The resulting paste was subjected to a vacuum to remove entrapped air and then cured in molds at atmospheric pressure for 90 minutes at 212° F. followed by 30 minutes at 350° F. The results of these experiments are shown in Table III.

TABLE III

| Example | Parts by Weight of Poly(vinyl chloride) | Heat Distortion Temperature, °C. (ASTM D 648-56) | Flexural properties (ASTM D 790-58T) | | Izod Impact, Foot-Pounds (ASTM D 256-56) | Brookfield Viscosity of Paste in Poises at 25° C. | | | | Durometer D Hardness |
|---|---|---|---|---|---|---|---|---|---|---|
| | | | Strength, p.s.i. | Modulus, p.s.i. | | Initial | 1 Day | 7 Day | 14 Day | |
| 9 | None | 95 | 11,957 | 4.92×10⁵ | 0.09 | | | | | 83 |
| 10 | 10 | 125 | 11,416 | 4.99 | 0.10 | 30 | 46 | 90 | 400 | 86 |
| 11 | 20 | 108 | 9,830 | 4.84 | 0.16 | 36 | 60 | 115 | 280 | 88 |
| 12 | 30 | 104 | 9,228 | 4.81 | 0.12 | 65 | 136 | 225 | 600 | 86 |
| 13 | 40 | 82 | 8,438 | 4.79 | 0.11 | 140 | 210 | 600 | 1,640 | 83 |
| 14 | 50 | 80 | 8,663 | 4.73 | 0.15 | 540 | 750 | 2,000 | | 82 |
| 15 | 60 | 81 | Broke | Broke | 0.13 | 2,000+ | | | | 85 |
| 16 | 65 | 74 | 4,988 | 4.58 | 0.14 | 2,000+ | | | | 85 |

Examples 17–24

These examples further illustrate the effect of varying the proportion of monomeric polyepoxide to poly(vinyl chloride). In each example 100 parts by weight of bis (3,4-epoxy-6-methylcyclohexylmethyl) adipate were employed, with 5 percent boron trifluoride-piperidine, based on weight of said epoxide, used as the catalyst. The vinyl chloride polymer employed was a poly(vinyl chloride) homopolymer having a reduced viscosity of about 1.32 in nitrobenzene. The test specimens were prepared in the same manner as the preparation employed in Examples 9–16. Results are shown in Table IV.

TABLE IV

| Example | Parts by Weight of Poly(vinyl chloride) | Heat Distortion Temperature, °C. (ASTM D 648-56) | Flexural Properties (ASTM D790-58T) | | Izod Impact, Foot-Pounds (ASTM D 256-56) | Durometer D Hardness | Brookfield Viscosity of the Paste in Poises at 25° C. | | | |
|---|---|---|---|---|---|---|---|---|---|---|
| | | | Strength, p.s.i. | Modulus, p.s.i. | | | Initial | 1 Day | 7 Day | 14 Day |
| 17 | None | 59 | 13,412 (yield) | 3.4×10⁵ | 0.22 | 82 | | | | |
| 18 | 10 | 67 | 13,764 | 3.39 | 0.29 | 81 | 20 | 20 | 26 | 48 |
| 19 | 20 | 60 | 14,136 | 3.66 | 0.41 | 78 | 25 | 30 | 37 | 76 |
| 20 | 30 | 68 | 14,300 | 3.76 | 0.85 | 80 | 35 | 43 | 80 | 155 |
| 21 | 40 | 68 | 14,337 (yield) | 3.88 | 0.68 | 77 | 63 | 92 | 221 | 440 |
| 22 | 50 | 71 | 13,979 (yield) | 3.88 | 0.68 | 83 | 150 | 230 | 710 | 1,380 |
| 23 | 60 | 70 | 11,969 | 4.07 | 0.48 | 83 | 820 | 1,420 | 2,000+ | |
| 24 | 65 | 64 | 13,076 | 3.67 | 0.48 | 82 | 2,000+ | | | |

Examples 25-28

These examples illustrate the effect of addition of non-reactive plasticizers to the compositions of this invention. In each case 100 parts by weight of a poly(vinyl chloride) homopolymer having a reduced viscosity of about 1.32 in nitrobenzene were dispersed in 80 parts by weight of dispersant. The reactive dispersant (polyepoxide) was 3,4-epoxy-6-methylcyclohexylmethyl 3,4-epoxy-6-methylcyclohexanecarboxylate. The non-reactive dispersant (plasticizer) was di-2-ethylhexyl adipate. Boron trifluoride-piperidine was employed as the catalyst in a concentration of 2 percent based on weight of epoxide. The components were stirred together into a paste, and then milled one pass through a three roll mill. The bake was 10 minutes at 350° F. Table V shows the change in physical properties that is effected by varying the proportion of reactive dispersant to non-reactive dispersant.

Example 32

A plastisol composition consisting of 100 parts of a poly(vinyl chloride) homopolymer having a reduced viscosity of about 1.42 in nitrobenzene, 55 parts of 3,4-epoxy-6-methylcyclohexylmethyl 3,4-epoxy-6-methylcyclohexanecarboxylate containing 3 weight percent of boron trifluoride-piperidine, and 25 parts of di-2-ethylhexyl adipate, was prepared by milling the mixed ingredients one pass through a three roll mill.

A series of organosol compositions were prepared by thinning down 9 parts by weight of the above-described plastisol with 1 part by weight of a thinner consisting of equal parts by weight of xylene, diisobutylketone, and apcothinner (a nontoxic, VM and P naphtha solvent prepared by straight-run overhead distillation of petroleum; specific gravity—0.763; A.P.I. gr.—54.0; viscosity—0.667 centipoise at 60° F.; initial boiling point—240–248° F.; 95 percent distilled in the range of 278–288° F.).

The organosols were sprayed on steel panels having zinc phosphate surface treatment (Bonderite 100, a treatment of zinc phosphate having a coating weight of 150–300 milligrams of zinc phosphate per square foot of treated metal), air-dried for 20 to 30 minutes, and baked for 10 minutes at 350° F. This series of coated panels was subjected to accelerated exposure tests such as Weather-Ometer, artificial sunlight, humidity, salt spray, alkali, and detergent. All of the coated panels exhibited generally good performance in these tests.

Example 33

Two solution coating formulations having the following compositions were prepared:

TABLE V

| Example | Parts by Weight of Polyepoxide | Parts by Weight of Non-reactive Plasticizer | Tensile data | | Hardness Durometer | | Percent Weight Loss [1] by extraction in— | | "Hesion" [2] |
|---|---|---|---|---|---|---|---|---|---|
| | | | P.s.i. | Percent Elongation | A | D | Hydrocarbon | Water | |
| 25 | 40 | 40 | 2,874 | 195 | 55 | 18 | 23.1 | 12.1 | 6.6 |
| 26 | 50 | 30 | 4,466 | 144 | 67 | 25 | 11.5 | 5.9 | 14.1 |
| 27 | 60 | 20 | 5,606 | 9.5 | 83 | 46 | 7.5 | 0.83 | 14.1 |
| 28 | 70 | 10 | 6,288 | 5.6 | 95 | 76 | 0.0 | 0.0 | 17.9 |

[1] Represents total weight loss after 10 days immersion at room temperature of a 4 mil film.
[2] Measured by casting a wedge-shaped film 4 mils maximum thickness on a CMQ (can maker's quality) steel substrate. The "Hesion" is the force in pounds per inch width of knife required to pull the film from the substrate, and is a measure of both adhesion to the substrate and cohesive strength of the film.

Examples 29-31

These examples illustrate the effect of varying the catalyst concentration. 100 parts by weight of a poly(vinyl chloride) homopolymer having a reduced viscosity of about 1.32 in nitrobenzene were dispersed in 55 parts of 3,4-epoxy-6-methylcyclohexyl 3,4-epoxy-6-methylcyclohexanecarboxylate and 25 parts of di-2-ethylhexyl adipate. The catalyst (boron trifluoride-piperidine) was employed in the concentrations indicated in Table VI. The formulations were stirred and then milled one pass through a three roll mill. The results are tabulated in Table VI.

TABLE VI

| Ex. | Weight Percent catalyst, Based on Epoxide | Tensile Data on Films Baked at 350° F. | | | | Durometer Hardness on ¼ inch Plaques Baked at 350° C. | | | |
|---|---|---|---|---|---|---|---|---|---|
| | | 5 Minute Bake | | 10 Minute Bake | | 10 Minute Bake | | 20 Minute Bake | |
| | | P.s.i. | Percent Elongation | P.s.i. | Percent Elongation | A | D | A | D |
| 29 | 3 | 3,640 | 210 | 3,420 | 108 | 70 | 39 | 78 | 55 |
| 30 | 5 | 4,750 | 23 | 4,850 | 11 | 85 | 62 | 85 | 72 |
| 31 | 8 | 3,331 | 14 | 3,300 | 10 | 86 | 72 | 93 | 75 |

|  | A | B |
|---|---|---|
| Polyepoxide [1] | 5 | 15 |
| Vinyl chloride copolymer [2] | 15 | 60 |
| Solvent [3] | 60 | |
| Catalyst [4] | 0.25 | |

[1] Bis(3,4-epoxy-6-methylcyclohexylmethyl) adipate.
[2] A polymer having 91 weight percent vinyl chloride units, 3 weight percent vinyl acetate units, and 6 weight percent vinyl alcohol units, and a reduced viscosity of 0.57.
[3] Equal parts by weight of methyl isobutyl ketone and toluene.
[4] Boron trifluoride-piperidine.

Fifteen-mil films (wet thickness) from each formulation were cast on glass and zinc phosphate-treated steel (Bonderite 100). The films were air-dried for two and one-half hours, followed by a bake of fifteen minutes at 300° F. The evaluation of the films is as follows:

On glass—Both A and B were hard and clear films having good color and adhesion to the glass. A had slightly better adhesion, as tested by manually prying the film loose with a knife.

On steel—A was a hard, clear film having good color and adhesion. B was black and had poor adhesion.

boxylate, 10 parts of a vinyl chloride homopolymer having a reduced viscosity of about 1.42, and 4.5 parts boron trifluoride-piperidine, was prepared by dissolving the boron trifluoride catalyst in the epoxide and then stirring the powdered vinyl chloride resin into the solution. The dispersion was subjected to vacuum to remove air and then thinned with 10 parts of "apco" thinner (a mixture of aliphatic hydrocarbons). The thinned dispersion was brushed on pieces of Volan A–181 glass cloth. The coated pieces were dried for 30 minutes at 100° C. in a forced convection oven. Twelve pieces were laminated together in a press for 30 minutes at 175° C. and 2500 p.s.i.g. pressure. The properties of the resulting laminate are shown in Table VII, below.

*Example 36*

A laminate was prepared following the same general procedure as described in Example 35, except that the formulation consisted of 60 parts of a vinyl chloride homopolymer having a reduced viscosity of 1.42, 40 parts of 3,4 - epoxy - 6 - methylcyclohexylmethyl 3,4 - epoxy - 6 - methylcyclohexanecarboxylate 20 parts of epoxidized soy bean oil, and 3 parts of boron trifluoride-piperidine. The properties of the resulting laminate are tabulated in Table VII below.

TABLE VII.—PHYSICAL AND ELECTRICAL PROPERTIES OF EPOXY-VINYL CHLORIDE RESIN LAMINATES

| Reference | PVC Percent in Dispersion | Percent Glass in Cured Product | H.D., °C./ Bar Thick. In.[1] | Flex.[2] Modulus, p.s.i.×10⁶ | Tensile Strength, p.s.i. | Flex.[2] Strength, p.s.i. | Durometer "D" Hardness |
|---|---|---|---|---|---|---|---|
| Example 35 | 10 | 61 | 257/.280 | 2.3 | 42,150 | 58,175 | 93 |
| Example 36 | 50 | 53 | 229/.326 | 2.07 | 27,588 | 53,175 | 90 |

| Reference | Vol. Resist. Ohms/cm.³ Sq. (50% RH) | Surface Resist. Ohms/cm.³ Sq. (50% RH) | Dielectric Constant, 23° C. Frequency, Cycles/Sec. | | | Dissipation Factor, 23°C. Frequency, Cycles/Sec. | | |
|---|---|---|---|---|---|---|---|---|
| | | | 60 | 10³ | 10⁶ | 60 | 10³ | 10⁶ |
| Example 36 | >10¹³ | >10¹³ | 2.78 | 3.41 | 2.43 | .00792 | .0019 | .0107 |
| Example 36 | >10¹³ | >10¹³ | 2.73 | 2.93 | 2.36 | .00874 | .0028 | .0092 |

[1] Heat distortion per bar thickness in inches measured as temperature in °C. where the bar deflects 10 mil with 264 lbs./sq./in. load. Two pieces of laminate bolted together to make bar. ASTM D648–56.
[2] Flexural modulus and strength measured ASTM D790–58T.
[3] 50% Relative Humidity.

*Example 34*

Two plastisol formulations were prepared which had the following formulations:

|  | A | B |
|---|---|---|
| Polyepoxide [1] | 15 | 15 |
| Poly(vinyl chloride) [2] | 15 | 15 |
| Catalyst [3] | 1.2 | |

[1] 3,4-epoxy-6-methylcyclohexylmethyl 3,4-epoxy-6-methylcyclohexanecarboxylate.
[2] A vinyl chloride homopolymer having a reduced viscosity of about 1.42.
[3] Tetraisopropyl titanate.

Ten grams of each plastisol were poured in inverted ¼-pint can lids, and baked for twenty minutes at 350° F. A comparison of the hardness exhibited by each plaque showed that A had a Durometer D hardness of 41 and B had a Durometer D hardness of 19.

*Example 35*

A dispersion consisting of 90 parts 3,4-epoxy-6-methylcyclohexylmethyl 3,4 - epoxy - 6 - methylcyclohexanecar-

*Examples 37–42*

Laminates were prepared from the following formulations:

|  | A | B |
|---|---|---|
| Vinyl chloride polymer [1] | 45 | 18 |
| Polyepoxide [2] | 30 | 72 |
| Epoxidized Soy Bean Oil | 15 | |
| Boron trifluoride-Monoethylamine | 1.8 | 2 |
| "Apco" thinner | 10 | 10 |

[1] A vinyl chloride homopolymer having a reduced viscosity of 1.42.
[2] 3,4-epoxy - 6 - methylcyclohexylmethyl 3,4-epoxy-6-methylcyclohexanecarboxylate.

12 ply Volan A–181 glass cloth laminates were prepared from the above formulations. Table VIII below lists the cloth impregnating conditions, curing conditions, and laminate properties for the various experiments.

TABLE VII.—PHYSICAL PROPERTIES OF LAMINATES

| Example | Formulation | Impregnating Conditions | Cure Conditions | | | Percent Glass in Cured Product | Flex. Modulus, p.s.i.×10⁶ | Flex. Strengt | Tensile Strength |
|---|---|---|---|---|---|---|---|---|---|
| | | | Time, min. | Temp., °F. | Pressure, p.s.i.g. | | | | |
| 37 | A | Pre-preg ¹ | 30 | 350 | 550 | 70 | 3.02 | 75,313 | 53,700 |
| 38 | B | Wet Lay-up | 15 | 375 | 100 | 70 | 2.7 | 70,600 | |
| 39 | B | Pre-preg ¹ | 15 | 375 | 100 | 70 | 3.2 | 79,500 | 52,900 |
| 40 | B | Pre-preg ² | 15 | 320 | 100 | 69 | 3.4 | 86,900 | |
| 41 | B | Pre-preg ² | 45 | 300–325 | 11–12 | 67 | 2.84 | 69,200 | 56,900 |
| 42 | B | Pre-preg ² | 15 | 320 | 30 | 68 | 3.22 | 82,800 | |

¹ Impregnated cloth dried for 30 seconds at 212° F.
² Impregnated cloth dried for 5 minutes at 158° F.

*Example 43*

A mixure of 18 parts of a vinyl chloride homopolymer (dispersion grade, reduced vicsosity about 1.42) and 72 parts of bis(3,4 - epoxy - 6 - methylcyclohexylmethyl) adipate was stirred to make a dispersion. Boron trifluoride-monoethylamine (2.1 grams) was added to the dispersion as a 50 weight percent solution in anhydrous methanol. The dispersion was then diluted to 55 percent solids with a 1:1 mixture (by weight) of methyl isobutyl ketone and Hi VM and P thinner (a mixture of aliphatic hydrocarbons marketed by Ashland Oil Company). Pieces of Volan A–181 glass cloth were saturated with the thinned dispersion and then were passed through steel squeeze rolls which had a 12-mil clearance. The impregnated cloth was then dried in a forced convection oven at 70° C. for 7–10 minutes. The cloth was cut into 10×10 inch pieces and stacked to make a 12 ply laminate. The laminate was pressed at 30 p.s.i.g. for 5 minutes at 70° C., after which the temperature was raised to 175° C. for 15 minutes at the same pressure. The laminate had the following properties:

Flexural strength at 25° C. _____p.s.i__ 69,575
Flexural modulus at 25° C.×10⁶ _____ 3.13

*Example 44*

A mixture of 18 parts of a vinyl chloride-vinyl acetate copolymer (about 92 weight percent vinyl chloride, reduced viscosity about 1.13 ¹) and 72 parts of 3,4-epoxy-6-methylcyclohexylmethyl 3,4 - epoxy - 6 - methylcyclohexanecarboxylate was stirred to make a dispersion. Boron trifluoride-monoethylamine (2.9 grams) was added to the dispersion.

Laminates were then prepared from the dispersion and Volan A–181 glass cloth according to the procedure described in Example 43. The laminate had the following properties:

Flexural strength _____p.s.i__ 67,190
Flexural modulus×10⁶ _____ 2.91

*Example 45*

A laminate was prepared according to the procedure described in Example 43, except that the glass cloth employed had been treated with gamma-aminopropyl triethoxy silane. The properties of the laminate were as follows:

Flexural strength _____p.s.i__ 65,849
Flexural modulus×10⁶ _____ 2.94

*Example 46*

A dispersion was prepared by stirring a mixture of 100 parts of a dispersion grade vinyl chloride homopolymer (reduced viscosity about 1.42), 67 parts of 3,4-epoxy-6-methylcyclohexylmethyl 3,4 - epoxy - 6 - methylcyclohexanecarboxylate, 33 parts of epoxidized soy bean oil, and 4 parts of boron trifluoride-monoethylamine. The dispersion was poured over a piece of 1½ ounce chopped strand fibre glass mat (Garanmat type 601, marketed by Johns-Manville) which had been placed on aluminum foil. The impregnated mat was then cured for 15 minutes at 30 p.s.i.g. and 175° C. in a closed press. The resulting laminate was tough and had a thickness of 63 mils.

*Example 47*

A clear rigidsol coating was prepared from a dispersion of 50 parts of a vinyl chloride homopolymer having a reduced viscosity of about 1.42, 50 parts of a vinyl chloride-vinylidene chloride copolymer having from 3 to 5 percent vinylidene chloride units and having a reduced viscosity of about 0.8, 17.5 parts of di(2-ethylhexyl) phthalate, 17.5 parts of di(2-ethylhexyl) adipate, and 2 parts of the diglycidyl ether of bisphenol A. The dispersion was cast on an aluminum panel (10 mils wet thickness) and gelled in an oven. A piece of 1½ ounce glass mat (Garanmat type 601) was then placed on the gelled coating, and saturated with the curable dispersion described in Example 46, except that 6 parts of catalyst were employed instead of 4. The impregnated mat was then cured in an oven for 15 minutes at 350° F., with a weighted panel on top.

A good laminate was thus made in which the vinyl film had excellent adhesion to the laminate substrate.

*Example 48*

Volan A–181 glass cloth was impregnated with a dispersion of 80 parts of 3,4 - epoxy - 6 - methylcyclohexylmethyl 3,4 - epoxy - 6 - methylcyclohexanecarboxylate, 20 parts of a dispersion grade vinyl chloride homopolymer having a reduced viscosity of about 1.42, and 2.4 parts of boron trifluoride-monoethylamine. The impregnated cloth was heated in a forced convection oven for 7–10 minutes at 70° C. Five pieces of cloth 10 x 10 inches were stacked on a panel on which a green pigmented plastisol film (of the same formulation as employed in Example 47) had been cast. The laminate was cured in an open face press for 6 minutes at 175° C. and 30 p.s.i.g. pressure. A good laminate was made in which the vinyl film had good adhesion to the laminate substrate.

*Example 49*

A dispersion was prepared by stirring a mixture of 20 parts of a dispersion grade vinyl chloride homopolymer having a reduced viscosity of about 1.42, 60 parts of 3,4-epoxy - 6 - methylcyclohexylmethyl 3,4-epoxy-6-methylcyclohexanecarboxylate, 20 parts of the diglycidyl ether of 2,2-bis(para-hydroxyphenyl) propane, and 2.4 parts of boron trifluoride-monoethylamine. A good laminate was prepared from this dispersion and Volan A–181 glass ¹ In cyclohexanone.

cloth according to the procedure described in Example 9. The laminate had the following properties:

Flexural strength _____ p.s.i__ 74,500
Flexural modulus × 10⁶ _____ 3.07

*Example 50*

This example illustrates the flame-resistant qualities of the glass fibrous reinforced compositions of the invention.

Laminates were prepared from mixtures having the following compositions:

| Laminate | A | B | C |
|---|---|---|---|
| Epoxide¹ | 72 | 100 | 67 |
| Epoxide² | | | 33 |
| Vinyl Chloride Polymer³ | 18 | | 100 |
| BF₃-Monoethylamine | 2.1 | 3 | 4 |
| Glass Fibrous Base | Volan A-181 | Volan A-181 | Garanmat Type 601 |

¹ 3,4-epoxy-6-methylcyclohexylmethyl 3,4-epoxy-6-methylcyclohexanecarboxylate.
² Epoxidized Soy Bean Oil.
³ A vinyl chloride homopolymer having a reduced viscosity of about 1.42.

Each of the laminates were subjected to the flame test described in ASTM D635–56T. Briefly, the test consists of clamping a ½-inch by 5 inch specimen in a horizontal position, applying a ⅜ inch bunsen burner with a 1-inch blue flame to one end of the specimen for 30 seconds, and recording the time and length of burn.

Laminate B burned the full length of the test specimen in about 4 minutes: rated "burning."

Laminates A and C burned for less than 60 seconds and burned less than 1 inch of the specimens: rated "self-extinguishing."

What is claimed is:

1. A curable composition that comprises:
(a) a polyepoxide of the formula

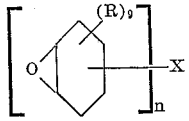

wherein each R individually represents a member of the group consisting of hydrogen, alkyl, and halogen, wherein *n* represents an integer having a value in the range of from 2 to 4, and wherein X represents an organic group of from 2 to 20 carbon atoms that has a valence of *n* and that contains no non-hydrocarbon moieties other than carbonyloxy and ether oxygen, provided that X contains at least one carbonyloxy group,
(b) a vinyl chloride polymer, wherein at least 50 percent of the monomer units are vinyl chloride, and
(c) a catalyst for promoting the polymerization of said polyepoxide.

2. A curable composition that comprises:
(a) a diepoxide of the formula

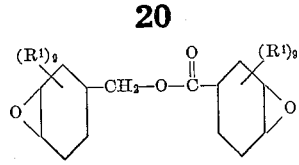

wherein each R¹ individually represents a member selected from the group consisting of hydrogen and alkyl of from 1 to 4 carbon atoms,
(b) a vinyl chloride polymer, wherein at least 50 percent of the monomer units are vinyl chloride, and
(c) a boron trifluoride-amine complex.

3. The curable composition of claim 2 wherein said diepoxide is 3,4-epoxy-6-methylcyclohexylmethyl 3,4-epoxy-6-methylcyclohexanecarboxylate.

4. The curable composition of claim 2 wherein said diepoxide is 3,4-epoxy-cyclohexylmethyl 3,4-epoxycyclohexanecarboxylate.

5. A curable composition that comprises:
(a) a diepoxide of the formula

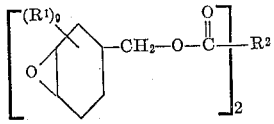

wherein each R¹ individually represents a member selected from the group consisting of hydrogen and alkyl, and wherein R² represents a divalent hydrocarbon group of from 0 to 10 carbon atoms,
(b) a vinyl chloride polymer, wherein at least 50 percent of the monomer units are vinyl chloride, and
(c) a boron trifluoride-amine complex.

6. The curable composition of claim 5 wherein said diepoxide is bis(3,4 - epoxy-6-methylcyclohexylmethyl) adipate.

7. The curable composition of claim 5 wherein said diepoxide is bis(3,4-epoxycyclohexylmethyl) adipate.

8. The cured composition produced by heating the curable composition of claim 1 to an elevated temperature sufficient to activate said catalyst for a period of time sufficient to polymerize said polyepoxide.

9. A composition that comprises a glass fibrous base impregnated with the curable composition of claim 1.

10. The glass fibrous reinforced composition produced by heating the composition of claim 9 to an elevated temperature sufficient to activate said catalyst for a period of time sufficient to polymerize said polyepoxide.

References Cited by the Examiner

UNITED STATES PATENTS

| | | | |
|---|---|---|---|
| 2,795,565 | 6/1957 | Newey | 260—836 |
| 2,892,808 | 6/1959 | Shafer | 260—37 |
| 3,000,848 | 9/1961 | McGary | 260—835 |
| 3,057,812 | 10/1962 | Straughan | 260—836 |
| 3,278,477 | 10/1966 | Evans | 260—836 |

MURRAY TILLMAN, *Primary Examiner.*

P. LIEBERMAN, *Assistant Examiner.*